Nov. 16, 1965 D. E. MOELLER 3,218,561

FREQUENCY STORAGE CIRCUIT AND METHOD

Filed May 2, 1962

Douglas E. Moeller

*INVENTOR*

United States Patent Office 3,218,561
Patented Nov. 16, 1965

3,218,561

FREQUENCY STORAGE CIRCUIT AND METHOD

Douglas E. Moeller, Nashua, N.H., assignor to Sanders Associates, Inc., Nashua, N.H., a corporation of Delaware Filed May 2, 1962, Ser. No. 191,775
4 Claims. (Cl. 328—121)

The present invention provides a method and system for producing a substantially constant amplitude CW output signal having a frequency corresponding to that of a received signal and a duration substantially greater than the duration of the received signal. In particular, the invention provides a system wherein an incoming signal is supplied through a switch to an amplifier input and a portion of the amplifier output is fed to the input of a passive signal storage or delay network. After a given period of time, preferably at least as long as the time delay introduced by the delay network, the amplifier input is switched to the output of the delay network, whereby the signal is repeatedly recirculated in a loop comprising the amplifier, the delay network and necessary coupling elements. This provides a continuous output at substantially the same frequency as the original received input signal until such time as the amplifier input is disconnected from the delay network.

In a typical prior approach to the problem of providing a frequency storage circuit, a portion of a gated CW signal of duration T is extracted from a transmission path and injected into a closed loop containing an amplifier and having a transit time equal to T. The signal is thus continuously recirculated in the loop, and during this time a portion of the circulating signal is injected back into the transmission path. Since the duration of the original gated signal is equal to the delay in the loop, the leading and trailing edges of the signal coincide, thus giving a continuous output until the loop amplifier is gated off.

A principal object of my invention is to provide an improved frequency storage method and apparatus.

A more specific object of the invention is to provide an improved recirculation type frequency storage method and apparatus which afford a substantial reduction in the number of costly parts.

It is a further object of the invention to provide circuits of the above character which have improved efficiency of operation.

Other objects of the invention will in part be obvious and will in part appear hereinafter.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which.

Figure 1:
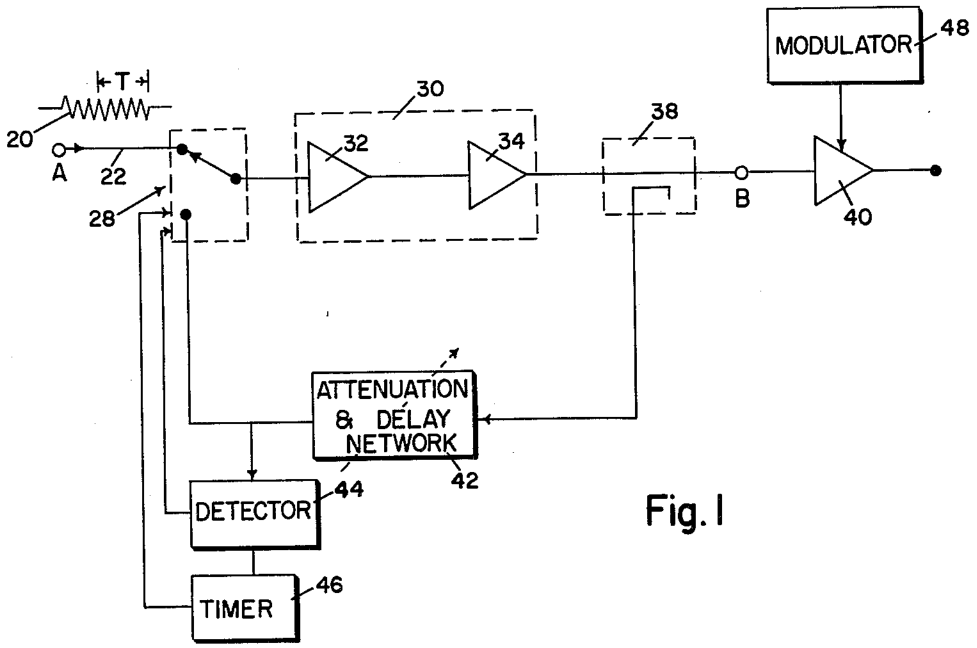
FIG. 1 is a schematic diagram of a frequency memory system incorporating the present invention.

Referring now to FIG. 1, a received high frequency CW signal burst 20 on input conductor 22 is applied to the input of an amplifier 30 by way of a switch 28. Preferably, the switch 28 is of the well-known electronic type rather than mechanical. For example, it may take the form disclosed in the copending application of John W. Spallone, Serial No. 175,164, filed February 23, 1962.

Amplifier 30 preferably includes one or more cascaded travelling wave tubes 32 and 34. The output of the amplifier is fed through a suitable directional coupler 38 to a load, which may include an amplifier 40 for further amplification if desired. Alternatively all or part of the output may be connected to an antenna.

The coupler 38 also transfers a portion of the signal to an attenuator and delay network 42, and the output of delay network 42 is returned to switch 28.

When switch 28 is energized to connect the input of amplifier 30 to the delay network 42, it closes a signal storage loop comprising amplifier 30, coupler 38 and network 42. At the same time, the input conductor 22 is disconnected from the amplifier 30. Assuming that operation of the switch 28 takes place after the arrival of the burst 20 by at least a length of time T, equal to the transit time around the storage loop, the loop is "full." Accordingly, a continuous signal is recirculated around the loop, and an output from the loop is applied to the amplifier 40, or other load, by way of the coupler 38.

One way in which timing of the switch operation may be accomplished is by using a detector 44, connected to the output of the network 42, to actuate the switch 28 for storage loop circulation. When the detector senses an output signal from the network 42, the loop will be full and thus ready for circulation. The switch may be returned to its initial position by a timer 46 which is started by the output of the detector 44.

It is generally desirable that the system provide a constant output amplitude despite variations in the amplitude of the input signal in order to provide frequency stability.

This is accomplished by operating the tubes 32 and 34 in their saturation region, where they act in an amplitude-limiting capacity. Accordingly, the attenuation in the network 42 is properly shaped across the frequency range of amplifier 30 to set a net loop gain of unity when the amplifier 30 is saturated, i.e., the gain of the amplifier 30 offsets the losses from the storage loop by way of the network 42, coupler 38 and detector 44. Operating amplifier 30 at saturation provides maximum memory stability because unwanted frequencies are suppressed; i.e., the gain of the loop is less than unity for all frequencies other than the desired one which caused saturation of the amplifier 30.

Thus, an input signal output of low amplitude builds up in amplitude as it is recirculated through the loop, until the amplifier 30 saturates. At this point the signal amplitude in the loop and the input of the amplifier 40 becomes constant because of the limiting action of the saturated amplifier 30. Since switch 28 alternatively connects hte amplifier 30 to either the conductor 22 or the network 42, the duration of the burst 20 need not be identical to the delay provided by network 42.

Serrodyne frequency modulation may be applied to the amplifier 40 by means of a modulator 48, if desired, in accordance with well-known techniques. However, the serrodyne signal is preferably applied to travelling wave tube 34. In such case, the signal will be modulated not only in its first passage through tube 34, but also each time it circulates around the storage loop. In some instances this may result in excessive distortion, a problem which is easily overcome by gating the modulator off when the amplifier 30 is connected to the network 42.

Figure 2:
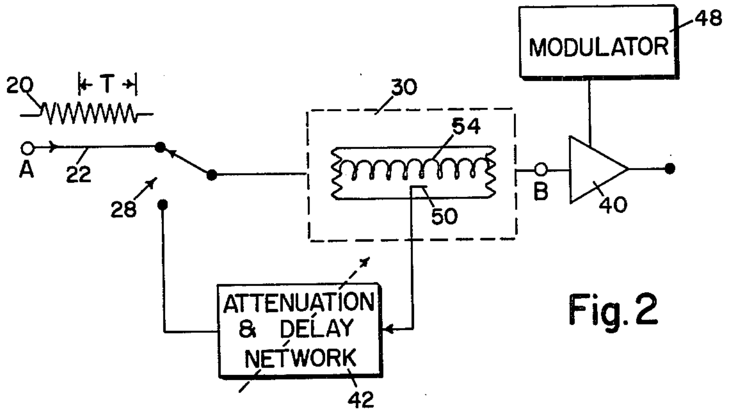
FIG. 2 is a schematic diagram of a second embodiment of the invention.

The system illustrated in FIG. 2 is substantially the same as the circuit of FIG. 1, except that instead of the separate external coupler 38 utilized in FIG. 1 to extract the signal for the frequency storage loop, I have provided for direct pickup from the travelling wave tube 34. More specifically, a probe 50, enclosed within the travelling wave tube 34, is positioned near the tube's signal-carrying helix 54. A portion of the signal advancing along the helix 54 is thereby transferred to the probe 50. The net gain in the storage loop depends on the longitudinal position of the probe with respect to the helix, as well as the amount of coupling between these elements. Thus, it may be set by proper control of these factors. In fact, the need for attenuation in the network 42 may be eliminated in this manner.

To summarize, I have provided an improved frequency storage method, together with circuits for practicing the method. My system reduces the cost and complexity of prior circuits by using the same amplifier both in the direct signal path and in the frequency storage loop. Moreover, the circuits described above utilize the amplifiers to the maximum extent. Only a minor portion of the output of each amplifier 30 need be extracted for recirculation to maintain the continuous stored-frequency signal. In prior systems, the 3 db couplers required for optimum operation make for a substantial loss of potential power output from the amplifiers used in the storage loops. The embodiment of FIG. 1 utilizes standard, well-known components, while the embodiment illustrated in FIG. 2 affords the same performance with a smaller number of circuit elements.

It will thus be seen that the objects set forth above, among those made apparent from the preceding description are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

1. A frequency storage circuit comprising, in combination, (a) a travelling wave tube having an input terminal and an output terminal, (b) switching means for alternately connecting said input terminal to a signal source and a third terminal, (c) a coupling probe extending into said tube between said input and output terminals for extracting a portion of the signal being amplified in said tube, (d) a delay element connected between said probe and said third terminal, (e) the degree of coupling of said probe, its position between said input and output terminals and the attenuation of said element being so correlated that the loop gain from said input terminal through said travelling wave tube and said delay element to said third terminal is substantially equal to unity.

2. Apparatus for providing a signal output corresponding in frequency to a received signal and having longer duration, comprising:

(a) an amplifier adapted to receive and amplify said received signal, (b) means for applying a portion of said received signal to the input of said amplifier, (c) means for transferring first a portion of the amplified signal to a load, (d) means for extracting a second portion of said amplified signal, (e) a signal delay device adapted to delay said second portion, (f) and means for substantially simultaneously disconnecting said signal source from said amplifier input and connecting said signal delay device to the input of said amplifier.

3. A frequency storage circuit comprising, in combination, (a) a storage loop including a series (1) an amplifier, said amplifier including a traveling wave tube, (2) coupling means, (3) a delay element, (4) and switching means, (5) the gain of said storage loop being a unity when said traveling wave tube is in its saturation region, (b) a load, (c) said coupling means coupling the output of said amplifier simultaneously to said load and to one end of said delay element, (d) said switching means alternately connecting the input of said amplifier to an input terminal and to the other end of said delay element.

4. A frequency storage circuit comprising, in combination, (a) a storage loop including in series (1) an amplifier, (2) coupling means, (3) a delay element, (4) and switching means, (b) a load, (c) said coupling means coupling the output of said amplifier simultaneously to said load and to one end of said delay element, (d) said swtiching means alternately connecting the input of said amplifier to an input terminal and to the other end of said delay element, (e) and means for controlling said switching means to connect said amplifier input to said delay element after an interval following the appearance of an input signal at said terminal, said interval being substantially the transit time around said loop.

References Cited by the Examiner

UNITED STATES PATENTS

| | | | |
|---|---|---|---|
| 2,482,974 | 9/1949 | Gordon | 328—38 XR |
| 2,601,289 | 6/1952 | Hollabaugh | 328—121 X |
| 2,827,566 | 3/1958 | Lubkin | 328—38 X |
| 2,830,179 | 4/1958 | Stenning | 328—121 X |
| 3,048,794 | 8/1962 | Ares | 328—38 X |

ARTHUR GAUSS, *Primary Examiner.*

JOHN W. HUCKERT, *Examiner.*